United States Patent [19]

Ou et al.

[11] Patent Number: 4,655,842

[45] Date of Patent: Apr. 7, 1987

[54] VERMICULITE DISPERSIONS AND METHOD OF PREPARING SAME

[75] Inventors: Chia-Chih Ou; Julie C. Yang, both of Lexington, Mass.

[73] Assignee: W. R. Grace & Co., Cambridge, Mass.

[21] Appl. No.: 764,910

[22] Filed: Aug. 12, 1985

[51] Int. Cl.$^4$ .............................................. C04B 14/00
[52] U.S. Cl. ................................................. 106/288 B
[58] Field of Search .................................... 106/288 B

[56] References Cited

U.S. PATENT DOCUMENTS

| | | | |
|---|---|---|---|
| 2,511,904 | 6/1950 | Clasen et al. | 106/108 |
| 3,325,340 | 1/1967 | Walker | 161/168 |
| 3,434,917 | 3/1969 | Kraus et al. | 162/3 |
| 3,540,892 | 11/1970 | Lard et al. | 106/15 |
| 4,144,083 | 3/1979 | Abercrombie, Jr. | 106/288 |
| 4,267,062 | 5/1981 | Byerley | 252/8.55 |
| 4,309,222 | 1/1982 | Hoyt | 106/288 |

FOREIGN PATENT DOCUMENTS

| | | | |
|---|---|---|---|
| 55844/80 | 9/1980 | Australia. | |
| 82/01682 | 6/1983 | PCT Int'l Appl. | 33/02 |

*Primary Examiner*—Theodore Morris
*Attorney, Agent, or Firm*—John J. Wasatonic; William L. Baker

[57] ABSTRACT

Stable vermiculite dispersions which are substantially free of settling and a method of preparing same are provided. The dispersions are obtained by treating the vermiculite platelets of which the dispersion is comprised with citrate anion. The citrate anion functions as a swelling agent for the vermiculite and enhances the rate and extent of swelling in an aqueous medium. The swollen vermiculite is delaminated by shearing to provide the inventive dispersions, which comprise a suspension of the delaminated platelets and citrate anion.

22 Claims, No Drawings

VERMICULITE DISPERSIONS AND METHOD OF PREPARING SAME

This invention relates to delaminated vermiculite dispersions and a method of producing same.

The term vermiculite refers to the group of rock forming mineral species characterized by a layer latticed structure in which the silicate layer units have a thickness of approximately 10 Å. The main elements present in the layer are magnesium, aluminum, silica and oxygen with the layers being separated by 1 or 2 sheets of water molecules associated with cations such as magnesium, calcium, sodium and hydrogen. The layers have considerable lateral extent relative to the thickness of the base 10 Å unit layer. The term vermiculite as used herein therefore includes minerals consisting wholly or largely of vermiculite, or minerals of a mixed-layer type containing vermiculite layers as an important constituent, such as hydrobiotites, and chlorite-vermiculite, but does not include minerals of the montmorillonite group.

U.S. Pat. No. 3,325,340 to G. Walker describes the production of dispersions of delaminated vermiculite and the production of films and coatings therefrom. The patent discloses that the dispersions can be prepared by treating vermiculite crystal with a solution containing a cation which can diffuse between the interlayers of the crystal's mineral structure and cause gross swelling in a direction normal to the main cleavage plane of the layer during immersion in water, immersing the treated vermiculite in water and permitting the swelling to occur, and shearing the swollen vermiculite to delaminate the layers and form a suspension of individual vermiculite flakes or platelets. The swelling of the vermiculite is believed to take place as a result of exchange of the cation of the treatment solution for the exchangeable cations of the vermiculite crystal. This cation exchange weakens the binding forces between the vermiculite platelets and thus allows swelling to occur in the presence of water. With the weakening of the binding forces and the swelling of the vermiculite, the individual platelets can be delaminated from one another under conditions of intense shearing, resulting in an aqueous suspension of the platelets, hereinafter referred to as a vermiculite dispersion.

As agents which can be used to promote the swelling of the vermiculite crystal, U.S. Pat. No. 3,325,340 specifically discloses the chloride salts of the following cations: n-butylammonium; iso-amylammonium; iso-butylammonium; n-propylammonium; the cationic form of amino acids, such as lysine or ornithine, and the lithium cation. The focus of the disclosure of this patent relative to promoting vermiculite swelling is the cation provided by these salts, since cation exchange is integral to effecting the desired swelling and delamination of the vermiculite. The anion provided by the salt used in the vermiculite treatment step is not indicated to be of importance in promoting the swelling of the vermiculite, or to otherwise affect the overall process for producing the dispersion.

As indicated by the above, the salts disclosed by U.S. Pat. No. 3,325,340 for use in the vermiculite treatment step are chloride salts and, in general, the chloride salts have been the predominant materials used in the preparation of vermiculite dispersions. In particular, n-butylammonium chloride and lithium chloride have become widely used for effecting the vermiculite swelling.

It has been observed by the inventors that vermiculite dispersions which are provided by use of conventional swelling agents, such as the chloride salts discussed above, have a number of drawbacks. Those prepared using chloride salts generally contain residual chloride, which is corrosive and thus may be of concern where it is desired to apply the dispersion to various metals. In addition, dispersions produced with the chloride and various other salts tend to be unstable, in that the vermiculite platelets in these dispersions tend to reaggregate after a period of time, e.g., within one to twenty four hours, and settle out of the dispersions. Agitation of the settled dispersion is thus required prior to use and, depending on the degree of reaggregation and settling, vigorous agitation or further shearing may be necessary to regenerate a uniform dispersion. This can engender increased process costs in the use of the dispersion as a result of the additional time, labor, and equipment which may be required.

The production of a stable dispersion in which the vermiculite platelets do not settle on standing would eliminate these costs. Moreover, for forming coatings and films with vermiculite dispersions, a stable dispersion would facilitate and help assure a uniform application of vermiculite platelets to the substrate of choice.

This invention is directed to a process of preparing stable aqueous vermiculite dispersions which are substantially free of settling, and to the resultant stable dispersions. In its method aspects, the present invention is directed to the discovery that stable vermiculite dispersions can be achieved by treating the vermiculite platelets of which the dispersion is comprised with citrate anion. Thus, stable vermiculite dispersions may be prepared by the prior art method involving cation exchange, swelling, and delamination, if it is further provided that citrate anion is employed as an agent to promote swelling of the vermiculite crystal. In addition to providing stable dispersions, the use of citrate anion also allows the production of dispersions which are chloride-free, and thus non-corrosive. Thus, in contrast to the prior emphasis on the cation which is exchanged with the vermiculite, the method of this invention relates to the use of a particular anion to provide desired improvements in the resultant dispersion.

This invention is accordingly directed in part to a method comprising the steps of treating crystals of vermiculite with citrate anion and a cation which promotes swelling of the crystals in a direction normal to the main cleavage plane of the crystals during immersion in water subsequent to said treatment; immersing the treated crystals in water; permitting the immersed crystals to swell; and subjecting the resultant swollen crystals while immersed in water to a shearing force to form a dispersion of vermiculite platelets.

As used herein, the term citrate anion is meant to refer to any of the anionic citrate species which may exist in solution, i.e., any of the partially or completely dissociated species.

In a typically conducted process of the invention, the vermiculite crystal is provided as the naturally occurring mineral, i.e., as particles of unexfoliated vermiculite ore. The ore particles are immersed in an aqueous treatment bath containing soluble citrate anion and a soluble cation capable of exchanging with one or more interlayer cations of the vermiculite lattice and promoting swelling as described above. The treatment bath may be prepared by dissolving in water a citrate salt and a non-citrate salt of the desired cation. Thus, any of the salts taught in U.S. Pat. No. 3,325,340, for example, may be used in the present invention, in conjunction with the use of citrate anion. Where such a mixture of salts is used, the citrate salt need not comprise a cation which can exchange with the vermiculite to promote swelling.

A common solution of both salts can be prepared and used to treat the vermiculite, i.e., the vermiculite is immersed in the solution and thus exposed to both ionic moieties simultaneously. Alternatively, the vermiculite may be treated sequentially with the ions, either by use of separate salt solutions or by later addition of one of the salts to a single treatment bath. It is generally preferred to employ treatment baths in which the cation concentration is at least 0.2N.

Rather than using individual salts of the cation and citrate anion, a water soluble citrate salt of a cation which can exchange with vermiculite to promote swelling can be used. In general, such a citrate salt will be the only swelling agent which is used to treat the vermiculite, although conventional swelling agents or citric acid may also be present, if desired, in the treatment bath. The citrate salt of any of the cations known to undergo exchange with one or more of the interlayer cations of vermiculite so as to promote swelling in the manner described above may be used in this invention, e.g., alkylammonium citrate salts having 3 to 6 carbon atoms in each alkyl group, the citrate salts of amino acids, or, preferably, lithium citrate.

The citrate anion can also be generated in situ in the treatment bath through the reaction of citric acid with a basic group capable of dissociating the acid. The basic group may be provided by addition of a separate base such as hydroxide to the treatment bath, by a basic reactive site on the vermiculite crystal, or as the anion of a non-citrate salt of the exchangeable cation. The latter method is exemplified by the addition of citric acid and lithium hydroxide or lithium carbonate to the treatment bath to generate lithium citrate which, as noted below, is a preferred swelling agent of this invention.

The concentration of citrate anion which can be used in the treatment bath is in the range of about 0.02N up to a saturation concentration. Where the citrate anion is used in association with a non-citrate salt which is capable of promoting swelling of vermiculite, a lower concentration, e.g., 0.02N to 0.20N may be suitable to enhance the swelling and provide a stable dispersion. Where a citrate salt of the exchangeable cation is used as the sole swelling agent, it is preferred to use a higher concentration in the range of about 0.5N up to a saturation concentration. A preferred range of citrate anion concentration is about 2N to 4N.

The vermiculite can usually be treated satisfactorily with the citrate and the exchangeable cation by immersion in a bath containing these ions for about 2 to 24 hours at room temperature with occasional stirring. This process can, however, be accelerated by more vigorous stirring or the application of heat. After completion of the treatment step, the ore is separated from the bulk of the treatment bath, e.g., by filtration or decantation. The treated ore is then immersed in water which is substantially free of electrolyte so as to create an electrolyte concentration gradient between the interior of the vermiculite ore particles and the surrounding medium. This gradient is believed to generate osmotic pressures which cause separation or partial delamination of the individual layers of the vermiculite and overall swelling of the ore particle.

Generally, the treated vermiculite particles are immersed in water for about 5 to 15 minutes at room temperature, the water decanted, and a quantity of fresh water added, and this process is repeated several times to achieve maximum swelling and the removal of substantially all of the ions in solution.

It has been found that the swelling of citrate treated samples begins almost instantaneously and that the maximum volume can be reached in an exceedingly short period of time, e.g., less than one hour. This may be contrasted with the swelling time to reach maximum volume of at least several hours observed with conventional swelling agents such as lithium chloride or n-butylammonium chloride. In addition, the maximum volume attained normally exceeds that obtained with conventional swelling agents. Based on measurement of the volume of the swollen vermiculite, that treated with citrate anion may swell 20% to 30% more than the same vermiculite treated with a conventional swelling agent.

The enhanced rate of swelling is obviously of advantage in minimizing the amount of time necessary to complete the preparative process. The increased degree of swelling is believed to facilitate the subsequent delamination of the vermiculite and the formation of a higher concentration of relatively thin platelets. The stability of the resultant dispersions and an enhanced degree of adhesiveness and cohesiveness observed in the resultant dispersions may, in part, be attributable to this higher concentration of thin platelets.

Subsequent to swelling, the final rinse bath is separated from the vermiculite and sufficient water is added to bring the vermiculite solids concentration to a desired level. The concentration may also be adjusted by addition or removal of water after delamination. Although the dispersions can be prepared to a vermiculite solids weight concentration of up to 20%, concentrations of less than 15% are normally preferred in order to attain a sufficiently low viscosity permitting easy handling and use. Weight concentrations in the range of about 4% to 12% are preferred, more preferably about 5% to 10%.

The delamination of the swollen vermiculite may be effected by the conventional means of high speed shearing which have been previously used, e.g., colloid mills, high speed blenders, homogenizers, and the like.

As indicated above, the cohesive and adhesive properties of the dispersions of this invention may exceed those of dispersions prepared similarly with a conventional swelling agent. For example, dispersions produced using lithium citrate as the swelling agent have been found to bind glass particles better than dispersions produced using n-butylammonium chloride or lithium chloride as swelling agents. Films made by casting dispersions prepared using lithium citrate may have an average tensile strength which is three to four times that of films of dispersions prepared similarly using lithium chloride.

Insofar as the present invention provides an enhanced rate or degree of vermiculite swelling, or improved stability, adhesiveness, or cohesiveness in the vermiculite dispersions, it should be understood that the degree of improvement which is obtained may vary with the geographic origin of the vermiculite ore. The present invention has been found to be especially beneficial with respect to all of the foregoing areas of improvement in the preparation and use of dispersions of vermiculite obtained from Libby, Mont.

The dispersions produced by the process of this invention comprise the delaminated vermiculite platelets in aqueous dispersion and citrate anion. It is believed that the citrate anion is associated with the vermiculite platelets. However, the nature of the association with vermiculite is not fully understood, and the amount of citrate anion which is associated with the vermiculite platelets, although known to be relatively small in comparison to the weight of vermiculite, has not been reliably quantified.

The dispersions of this invention can be used in any application for which vermiculite dispersions in general have been known. The dispersions can be used in the making of non-burning papers, e.g., as disclosed in U.S. Pat. Nos. 3,434,917 and 3,654,073 and in the published report of the Closed Systems Division of the National Aeronautic and Space Administration entitled "Development of Inorganic Nonflammable Vermiculite Flight Paper", Contract NAS 9-7782, published in 1969. The dispersions of this invention can also be used to form fireproofing coatings on combustible materials such as cellulose fibers, as disclosed, for example, in U.S. Pat. No. 3,540,892, and to upgrade the fire and heat resistance of non-combustible fibers, e.g., as in U.S. Pat. No. 3,654,073. The dispersions can also be cast as self-supporting films or to form coatings on such substrates as foams, metals, and plastic sheets.

The present invention is further described by the following Examples, which are illustrative only and not intended to be of limiting effect.

EXAMPLE 1

Two hundred grams of No. 5 grade vermiculite ore from Libby, Mont. were immersed in 500 ml. of a 5N aqueous solution of lithium citrate tetrahydrate ($Li_3C_6H_5O_7.4H_2O$). The mixture was stirred until it was homogeneous and allowed to stand for an additional 24 hours at room temperature. The mixture was then transferred to a 2000 ml. graduated cylinder. The supernatant was decanted and 500 ml. of distilled water were added. After about 10 minutes the water was decanted and the process of water addition and decanation was repeated four times.

The vermiculite began to swell almost immediately with the first 500 ml. wash, and reached its maximum volume about 10 minutes after the last wash. During the swelling period, the swelling volume was determined as a function of time. The volume was determined during each of the washes by covering the cylinder after addition of the wash water, inverting the cylinder back and forth several times, allowing the vermiculite to settle, and then noting the volume occupied by the settled vermiculite in the graduated cylinder at the end of each 10 minute wash period. Volume measurements were thus taken at ten minute intervals during the washing cycle.

After decanting the last wash, sufficient distilled water was added to the graduated cylinder to bring the volume to 2000 ml. Periodic volume measurements were continued. Prior to each measurement, the cylinder was again inverted several times and the vermiculite then allowed to settle for 5 minutes.

For comparison, 200 gm. samples of the ore were similarly treated and swollen using lithium chloride, lithium nitrate, and lithium hydroxide. The swelling volumes of these samples were measured as for the lithium citrate sample. The measured volumes for each sample are given in the following Table 1.

TABLE 1

| Time after beginning rinse (min.) | Volume (ml.) | | | |
|---|---|---|---|---|
| | Li Citrate | LiCl | LiNO$_3$ | LiOH |
| 0 | 215 | 200 | 200 | 195 |
| 10 | 225 | 210 | 210 | 190 |
| 20 | 250 | 220 | 230 | 190 |
| 30 | 390 | 260 | 270 | 195 |
| 40 | 680 | 320 | 380 | 195 |
| 50 | 1040 | 550 | 560 | 250 |
| 60 | 1880 | 750 | 825 | 250 |
| 120 | 1610 | 980 | 1020 | 195 |
| 180 | 1630 | 1110 | 1150 | 195 |
| 240 | 1650 | 1180 | 1240 | 195 |
| 300 | 1685 | 1210 | 1245 | 195 |
| 360 | 1750 | 1210 | 1245 | 195 |

The results of Table 1 show lithium citrate to be markedly superior as a swelling agent to the various other lithium salts, in terms of the rate and the degree of swelling which were obtained.

EXAMPLE 2

Four kilograms of the #5 grade Libby vermiculite were soaked in four liters of a 5N aqueous solution of lithium citrate tetrahydrate for 24 hours with occasional stirring. The vermiculite was then washed with five 8 liter portions of distilled water, causing swelling to a volume of about 30 liters. After decanting the last wash, the vermiculite was placed in 10 gallons of distilled water and allowed to stand overnight. Heavy rock-like particles were then removed from the mix by swirling the mix and decanting the outer portions onto a 70 mesh screen, leaving the heavier particles in the vortex. The vermiculite was then placed in sufficient distilled water to bring the vermiculite concentration to about 10% by weight and sheared in a homogenizer, sold by APV Gaulin, Everett, Mass., at a pressure of 3000 psi. A stable dispersion resulted in which the platelets remained in suspension indefinitely.

A second dispersion which was similarly prepared, except that the shearing pressure was 8000 psi, showed only a slightly greater tendency to settle. In contrast, dispersions prepared at both shearing pressures using lithium chloride instead of lithium citrate as a swelling agent showed an appreciable amount of settling within a few hours.

To measure the settling and settling rate 2000 ml. portions of the above dispersions were placed in graduated cylinders and the volume of sediment visually determined at various intervals. The results of these measurements are presented in Table 2.

TABLE 2

| Dispersion Swelling Agent | Shearing Pressure (psi) | Sediment Volume (ml.) vs. Standing Time (hr.) Time: | | | | | | | |
|---|---|---|---|---|---|---|---|---|---|
| | | 0 | 20 | 24 | 67 | 90 | 114 | 139 | 260 |
| | | Volume: | | | | | | | |
| Lithium Citrate | 3000 | 0 | 0 | 0 | 0 | 0 | 10 | 15 | 20 |
| Lithium Citrate | 8000 | 0 | 10 | 15 | 20 | 40 | 40 | 45 | 70 |

TABLE 2-continued

| Dispersion Swelling Agent | Shearing Pressure (psi) | Sediment Volume (ml.) vs. Standing Time (hr.) Time: | | | | | | | |
|---|---|---|---|---|---|---|---|---|---|
| | | 0 | 20 | 24 | 67 | 90 | 114 | 139 | 260 |
| Lithium Chloride | 3000 | 0 | 1260 | 1360 | 1480 | 1470 | 1390 | 1375 | 1375 |
| Lithium Chloride | 8000 | 0 | 450 | 520 | 1000 | 1320 | 1430 | 1360 | 1340 |

EXAMPLE 3

Lithium citrate and lithium chloride dispersions prepared as in Example 2 using a shearing pressure of 3000 psi were drawn down on a granite surface using a draw down bar set to provide a film 40 mils thick. The films were allowed to set at room temperature overnight and then dried in an oven at 70° C. overnight. Two films prepared from the lithium citrate dispersion were measured to have an average thickness of 4.5 mils while two films formed from the lithium chloride dispersion were measured to have an average thickness of 8.5 mils.

The films were die cut into 1×5 inch strips and again placed in the oven at 70° C. for further driving.

Upon removal from the oven, the tensile strength of each strip was measured on an Instron measuring instrument set in the 0 to 20 pound range and at a cross speed of 0.05 inches per minute. The average tensile strength of the lithium citrate dispersion films was about 4100 psi while that of the lithium chloride dispersion films was about 950 psi.

In the case of both dispersions, the films showed a decrease in tensile strength upon exposure to ambient atmospheric conditions.

EXAMPLE 4

Five 200 gram samples of #5 grade Libby vermiculite were each soaked for 24 hours at room temperature in 500 ml. of a 5N lithium chloride solutions to which were added different amounts of citric acid. The treated samples were washed and their swelling volume measured in the same manner as in Example 1, except that the wash times and volume measurements were at 5 minute intervals. The washing was thus completed after 25 minutes. The samples were then allowed to swell further in 2000 ml. of distilled water up to 1440 minutes. Table 3 lists the concentrations of citric acid and the swelling volume time for each concentration.

The results of Table 3 demonstrate that citric acid can be used to provide citrate anion and that small amounts of the anion can enhance the rate and degree of swelling of vermiculite. The optimum concentration of citric acid in this Example was between 0.02N and 0.2N.

Shearing of the samples containing 0.02N and 0.2N citric acid yielded stable dispersions.

What is claimed is:

1. A process for preparing aqueous vermiculite dispersions comprising the steps of:
   treating vermiculite crystals with citrate anion and a cation which promotes swelling of said crystals in a direction normal to the main cleavage plane of said crystals during immersion in water subsequent to said treatment;
   immersing the treated crystals in water;
   permitting the immersed crystals to swell; and
   subjecting the resultant swollen crystals while immersed in water to a shearing force to delaminate the vermiculite crystal and form a suspension of delaminated vermiculite platelets.

2. A process of claim 1 wherein said vermiculite is treated by immersion in an aqueous treatment bath containing a solubilized citrate salt and a solublized non-citrate salt of said cation.

3. A process of claim 1 wherein said vermiculite is treated by immersion in an aqueous treatment bath comprising citric acid and a solubilized non-citrate salt of said cation.

4. A process of claim 3 wherein said non-citrate salt is a lithium salt.

5. A process of claim 1 wherein said cation is selected from the group consisting of N-alkylammonium cations having 3 to 6 carbon atoms inclusive in each alkyl group, the cationic form of an amino acid, and lithium cation.

6. A process of claim 1 wherein said cation is lithium cation.

7. A process of claim 1 wherein said vermiculite is treated by immersion in an aqueous treatment bath containing a solubilized citrate salt of said cation.

8. A process of claim 7 wherein said citrate salt is lithium citrate.

9. A process of claim 1 wherein said vermiculite is treated sequentially with said citrate anion and said cation.

10. A process of claim 1 wherein said vermiculite is treated by immersion in a treatment bath comprising said citrate anion in a concentration in the range of about 0.02N. up to a saturation concentration.

11. A process of claim 10 wherein the concentration of said citrate anion is in the range of about 2N. to 4N.

12. A process of claim 3 wherein the concentration of citric acid in said bath is in the range of about 0.02N. to 0.2N.

13. A process of claim 7 wherein the concentration of said citrate salt is in the range of about 0.5N. up to a saturation concentration.

14. A process of claim 13 wherein the concentration of said citrate salt is in the range of about 2N. to 4N.

TABLE 3

| Concentration of Citric Acid | [Cit. Acid]/[Lit+] Mole Ratio | Swelling Volume (ml.) vs. Time (Minutes) | | | | | | | | | | | | | |
|---|---|---|---|---|---|---|---|---|---|---|---|---|---|---|---|
| | | 0 | 5 | 10 | 15 | 20 | 25 | 30 | 60 | 90 | 120 | 150 | 180 | 210 | 240 | 1440 |
| 0 | 0 | 185 | 218 | 202 | 272 | 395 | 560 | 916 | 915 | 1160 | 1205 | 1240 | 1285 | 1290 | 1320 | 1408 |
| 0.02 N | 0.0013 | 180 | 219 | 236 | 306 | 482 | 720 | 980 | 994 | 1262 | 1305 | 1335 | 1360 | 1360 | 1425 | 1452 |
| 0.2 N | 0.013 | 210 | 220 | 258 | 396 | 658 | 940 | 1550 | 1185 | 1395 | 1420 | 1450 | 1490 | 1525 | 1585 | 1575 |
| 2 N | 0.13 | 220 | 240 | 296 | 430 | 610 | 818 | 1430 | 1070 | 1225 | 1250 | 1280 | 1280 | 1275 | 1310 | 1320 |
| 5 N | 0.33 | 205 | 225 | 278 | 355 | 455 | 565 | 795 | 820 | 960 | 1020 | 1060 | 1060 | 1120 | 1180 | 1298 |
| 10 N | 0.66 | 300 | 240 | 278 | 326 | 380 | 428 | 500 | 605 | 740 | 820 | 900 | 925 | 1015 | 1105 | 1522 |

15. A process of claim 1 wherein the weight concentration of vermiculite platelets in the dispersion formed by shearing said swollen vermiculite is less than about 15% based on the weight of the dispersion.

16. A process of claim 15 wherein the weight concentration of vermiculite platelets is in the range of about 4% to 12%.

17. A vermiculite dispersion prepared by the process of claim 1.

18. An aqueous dispersion comprising delaminated vermiculite platelets and citrate anion.

19. A dispersion of claim 18 wherein the weight concentration of said vermiculite platelets is less than about 15%, based on the weight of said dispersion.

20. A dispersion of claim 19 wherein the weight concentration of said vermiculite is in the range of about 4% to 12%, based on the weight of said dispersion.

21. A process for preparing a stable dispersion of vermiculite platelets which comprises contacting said platelets with citrate anion to substantially prevent the settling out of said platelets from said dispersion.

22. A process for increasing the rate and extent of swelling of vermiculite ore particles comprising the steps of:

treating vermiculite ore particles with citrate anion and a cation which promotes swelling of said particles in a direction normal to the main cleavage plane of said particles during immersion in water subsequent to said treatment;

immersing the treated particles in water; and permitting the immersed particles to swell.

* * * * *